United States Patent [19]

McCracken

[11] Patent Number: 4,992,943

[45] Date of Patent: Feb. 12, 1991

[54] APPARATUS FOR DETECTING AND STORING MOTOR VEHICLE IMPACT DATA

[76] Inventor: Jack J. McCracken, 401 S. Jameson St., Lima, Ohio 45805

[21] Appl. No.: 309,172

[22] Filed: Feb. 13, 1989

[51] Int. Cl.[5] .................. G06F 15/74; G01P 15/00; G01L 5/00

[52] U.S. Cl. .................. 364/424.04; 73/514; 340/436

[58] Field of Search .................. 364/424.04; 340/436; 73/432.1, 514; 123/198 DB

[56] References Cited

U.S. PATENT DOCUMENTS

| | | | |
|---|---|---|---|
| 2,876,688 | 3/1959 | Laue | 340/937 |
| 3,964,016 | 6/1976 | Yamada et al. | 340/436 |
| 4,114,450 | 9/1978 | Shulman et al. | 340/531 |
| 4,395,624 | 7/1983 | Wartski | 364/424.04 |
| 4,454,843 | 6/1984 | Uchida et al. | 123/198 DB |
| 4,638,289 | 1/1987 | Zottnik | 340/436 |
| 4,671,111 | 6/1987 | Lemelson | 364/424.04 |
| 4,745,564 | 5/1988 | Tennes et al. | 364/566 |
| 4,836,024 | 6/1989 | Woehrl et al. | 340/436 |
| 4,853,856 | 8/1989 | Hanway | 364/424.04 |
| 4,853,859 | 8/1989 | Morita et al. | 364/424.04 |
| 4,866,616 | 9/1989 | Takeuchi et al. | 364/424.04 |

*Primary Examiner*—Felix D. Gruber
*Attorney, Agent, or Firm*—Andrew Beckerman-Rodau

[57] ABSTRACT

An invention which facilitates motor vehicle accident reconstruction by providing apparatus for detecting and storing data describing the status of a motor vehicle when it is involved in a collision. The invention includes a plurality of impact detectors, a microprocessor which obtains vehicle status data from the computer systems used in modern motor vehicles, and a memory, such as an EPROM, for storing the data for later retrieval.

30 Claims, 3 Drawing Sheets

APPARATUS FOR DETECTING AND STORING MOTOR VEHICLE IMPACT DATA

BACKGROUND OF THE INVENTION

This invention relates to apparatus which detects vehicle impacts and stores both impact data and data representative of the status of the vehicle during impact.

It is desirable to have accurate data describing the status of a motor vehicle upon impact for accident reconstruction. Such accident reconstruction is crucial for determining, among other things, liability arising from an accident. Data with regard to the location of the vehicle impact, the speed of the vehicle, the status of the passenger restraint systems, the status of vehicle lights, and the status of the directional signals are all crucial facts for determining precisely what occurred during an accident.

In a lawsuit seeking damages for property damage and personal injuries arising from a motor vehicle accident it is imperative to reconstruct the accident because liability ultimately depends upon the fault of the motor vehicle operators. In many states today a court must even determine the percentage of fault of each motor vehicle operator if a multi-car accident is involved because liability may be assessed against each operator in proportion to the percentage of fault for which each operator is responsible.

Accidents typically occur very rapidly and unexpectedly, and therefore the motor vehicle operators involved will often not sufficiently recall exactly what transpired during the accident. Additionally, the observations of any passengers in the motor vehicles and any witnesses to an accident are frequently inaccurate due to the rapid and unexpected nature of most motor vehicle accidents.

SUMMARY OF THE INVENTION

The present invention facilitates accident reconstruction by providing apparatus for detecting and storing data which describes the status of a motor vehicle when the motor vehicle is subjected to an impact. This allows an accurate assessment of the condition of the motor vehicle at the time of impact. For example, it allows an after-the-fact determination of the speed of the vehicle upon impact. Additionally, it can accurately be determined whether the impacted vehicle's headlights or directional signals were on and whether the vehicle's passenger restraint systems were in use.

The present invention is designed to take advantage of the vehicle status data that is available from the on-board computers used in modern motor vehicles. However, the invention can also be used with motor vehicles which do not employ on-board computers. Additionally, the present invention provides apparatus which only detects and stores data describing the status of a motor vehicle when the vehicle is subjected to an impact rather than continuously monitoring the status of the motor vehicle.

In general, the invention features, in one aspect, apparatus for detecting and storing motor vehicle status data in response to an impact. The apparatus includes a plurality of impact detection devices located adjacent to the exterior surfaces of the motor vehicle. The devices sense motor vehicle impacts which exceed a predetermined impact threshold level. The apparatus also includes a polling device which is responsive to activation of at least one of the impact detection devices. The polling device determines substantially instantaneous data values which are representative of the status of the motor vehicle. The apparatus further includes a data storage device for continuous storage of the instantaneous data values determined by the polling device, and a data output device for retrieval of the instantaneous data values stored by the data storage device.

In preferred embodiments, the instantaneous data values represent the motor vehicle speed, the date and time of impact, and the status of the motor vehicle passenger restraint systems.

In additional preferred embodiments, the instantaneous data values identify the particular impact detection device activated and the status of the motor vehicle lighting. The status of the motor vehicle lighting may further identify the status of the motor vehicle directional signal lights, the status of the motor vehicle headlights, and the status of the motor vehicle taillights.

In still additional preferred embodiments, the predetermined impact threshold level is fifteen miles per hour; the data storage devise is a PROM, which may be removable from the apparatus for detecting and storing motor vehicle impact data; the data storage device is an EPROM; the data output device is a serial port; the polling device further includes apparatus for periodically erasing the stored instantaneous data values whenever a predetermined number of motor vehicle impacts exceeding a predetermined impact threshold level are sensed by the impact detection devices; the polling device is a microprocessor; and the microprocessor polls the motor vehicle's on-board computer to determine the motor vehicle status.

In another preferred embodiment, the polling means includes a microprocessor and a plurality of polling lines. Each of the polling lines connects the polling means to an activation switch for the motor vehicle system being monitored. The polling line is capable of transmitting a signal from the polling means to the activation switch. A plurality of signal return lines connects each of the activation switches to the polling means and is capable of receiving the signal transmitted to the activation switch only when the activation switch is in an activated position, so that the instantaneous data values representative of the motor vehicle status are determined from the signals received by the polling means from the activation switches.

In another preferred embodiment, the apparatus for detecting and storing motor vehicle impact data further includes identification apparatus for ascertaining the motor vehicle operator. The identification apparatus further includes a data entry device which enables the motor vehicle to be operated upon entry of a valid operator identification code, and which enables storage of data identifying the operator in the data storage device.

In another aspect, the invention features, apparatus for detecting and storing motor vehicle status data in response to an impact which includes a plurality of impact detection devices located adjacent to the exterior surfaces of the motor vehicle for sensing motor vehicle impacts that exceed a predetermined impact threshold level. The apparatus also includes a polling device which is responsive to activation of at least one of the impact detection devices. The polling device determines data values that are representative of the motor vehicle status. The data values are determined substantially contemporaneously with the impact detection device sensing an impact exceeding a predetermined threshold level, and at subsequent predetermined intervals following the impact. The apparatus further includes a data storage device for continuous storage of the instantaneous data values determined by the polling device, and a data output device for retrieval of the instantaneous data values stored by the data storage device.

In a preferred embodiment, the apparatus further includes identification apparatus for ascertaining the motor vehicle operator. The identification apparatus includes a data entry device which enables operation of the motor vehicle upon entry of a valid operator identification code, and which enables storage of data identifying the operator in the data storage device.

In other preferred embodiments, the polling means is a microprocessor; the microprocessor polls the motor vehicle's on-board computer to determine the motor vehicle status.

In another preferred embodiment, the polling means includes a microprocessor and a plurality of polling lines. Each of the polling lines connects the polling means to an activation switch for the motor vehicle system being monitored. The polling line is capable of transmitting a signal from the polling means to the activation switch. A plurality of signal return lines connects each of the activation switches to the polling means and is capable of receiving the signal transmitted to the activation switch only when the activation switch is in an activated position, so that the instantaneous data values representative of the motor vehicle status are determined from the signals received by the polling means from the activation switches.

In another aspect, the invention features, apparatus for detecting and storing motor vehicle status data in response to an impact which includes a plurality of impact detection devices located adjacent to exterior surfaces of the motor vehicle for sensing motor vehicle impacts exceeding a predetermined threshold level. The apparatus also includes a microprocessor responsive to the impact detection devices. The microprocessor, upon activation of at least one of the impact detection devices, determines data values. The data values identify the activated impact detection device, the activation time and date, and the motor vehicle status at substantially the time of the activation of the impact detection device. The motor vehicle status represents the vehicle speed, the status of the vehicle passenger restraint systems, the status of the vehicle lights, and the status of the vehicle directional signals. The apparatus further includes an EPROM, connected to the microprocessor, which provides continuous storage of the data values. The EPROM is responsive to the microprocessor which periodically erases the data values stored in the EPROM whenever a predetermined number of motor vehicle impacts exceeding a predetermined impact threshold level are sensed by the impact detection devices. The apparatus additionally includes a serial output port for retrieval of the stored data values from the EPROM.

In preferred embodiments, the microprocessor polls the motor vehicle's on-board computer to determine the motor vehicle status.

In another preferred embodiment, the polling means includes a microprocessor and a plurality of polling lines. Each of the polling lines connects the polling means to an activation switch for the motor vehicle system being monitored. The polling line is capable of transmitting a signal from the polling means to the activation switch. A plurality of signal return lines connects each of the activation switches to the polling means and is capable of receiving the signal transmitted to the activation switch only when the activation switch is in an activated position, so that the instantaneous data values representative of the motor vehicle status are determined from the signals received by the polling means from the activation switches.

In another preferred embodiment, the apparatus further includes identification apparatus for ascertaining the motor vehicle operator. The identification apparatus includes a data entry device which enables operation of the motor vehicle upon entry of a valid operator identification code, and which enables storage of data identifying the operator in the data storage device.

All the features and advantages of the invention will be apparent from the following detailed description of the preferred embodiments and from the claims.

For a full understanding of the present invention, reference should now be made to the following description and the accompanying drawings.

DETAILED DESCRIPTION OF THE PREFERRED EMBODIMENTS

Figure 1:
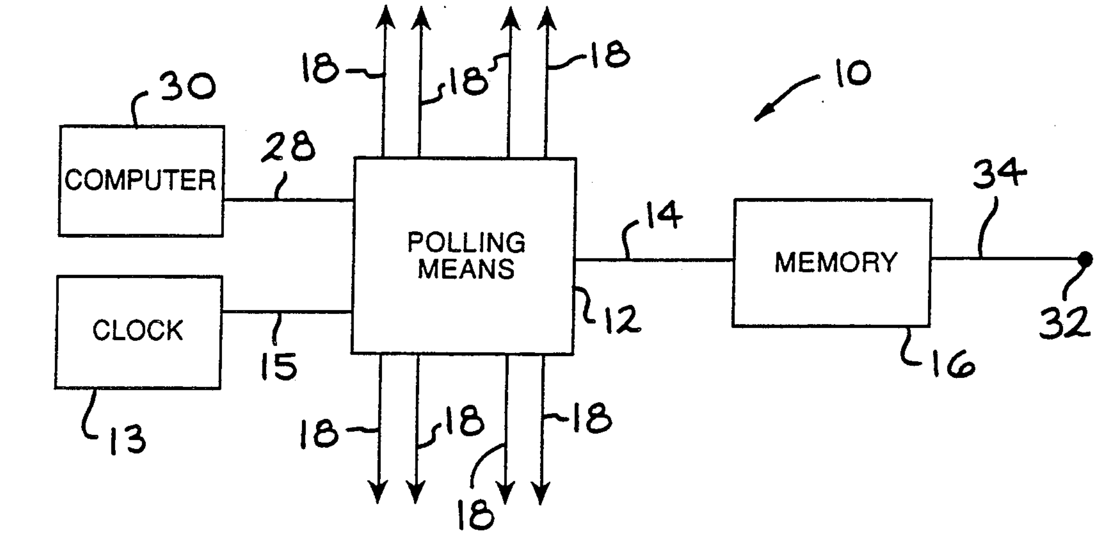
FIG. 1 is a diagrammatic view of a preferred embodiment of the invention.
Figure 2:
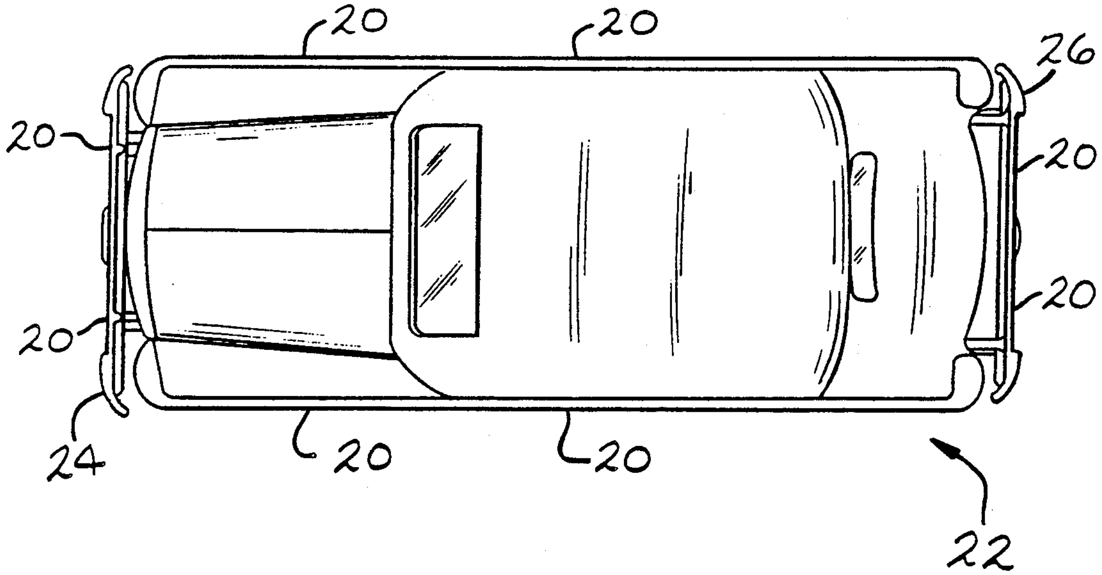
FIG. 2 is a top plan view of an automobile showing the locations of impact sensors in a preferred embodiment of the invention.

Referring to FIGS. 1 and 2, there is shown a diagrammatic and top plan view respectively of an embodiment of the apparatus for detecting and storing motor vehicle status data in response to an impact, generally designated 10. Apparatus 10 includes polling means 12 which can typically be an Intel 8088 microprocessor available from Intel Corporation, 3065 Bowers avenue, Santa Clara, California 95051. Connected to polling means 12, via line 14, is data storage means 16, which can typically be a computer memory device such as an erasable programmable read only memory (hereinafter EPROM). A typical EPROM would be Intel model number D 27C64-25 available from Intel Corporation, 3065 Bowers avenue, Santa Clara, California 95051. Polling means 12 is also connected, via sensor input lines 18, to impact sensors 20 located around the periphery of motor vehicle 22 which is typically an automobile, as shown in FIG. 2. Referring to FIG. 2, two sensors are located on both front bumper 24 and rear bumper 26. Additionally, two sensors are located on either side of motor vehicle 22.

In preferred embodiments, the sensors are integral with the vehicle's bumpers and side body so that the vehicle's appearance is not altered by impact sensors 20. Sensors 20 can be any type of mechanical, electrical, or other device which can produce an electrical signal in response to an impact. An example of such a sensor is shown in U.S. Pat. No. 3,964,016 (see FIG. 4) which discloses an electromechanical sensor that produces an electrical signal in response to an impact.

Polling means 12 is also connected to vehicle status input line 28. Vehicle status input line 28 is connected to the motor vehicle's on-board computer 30 which is commonly used in modern motor vehicles. Serial output port 32, connected to data storage means 16 via output line 34, allows the data stored by apparatus 10 to be retrieved.

Figure 3:
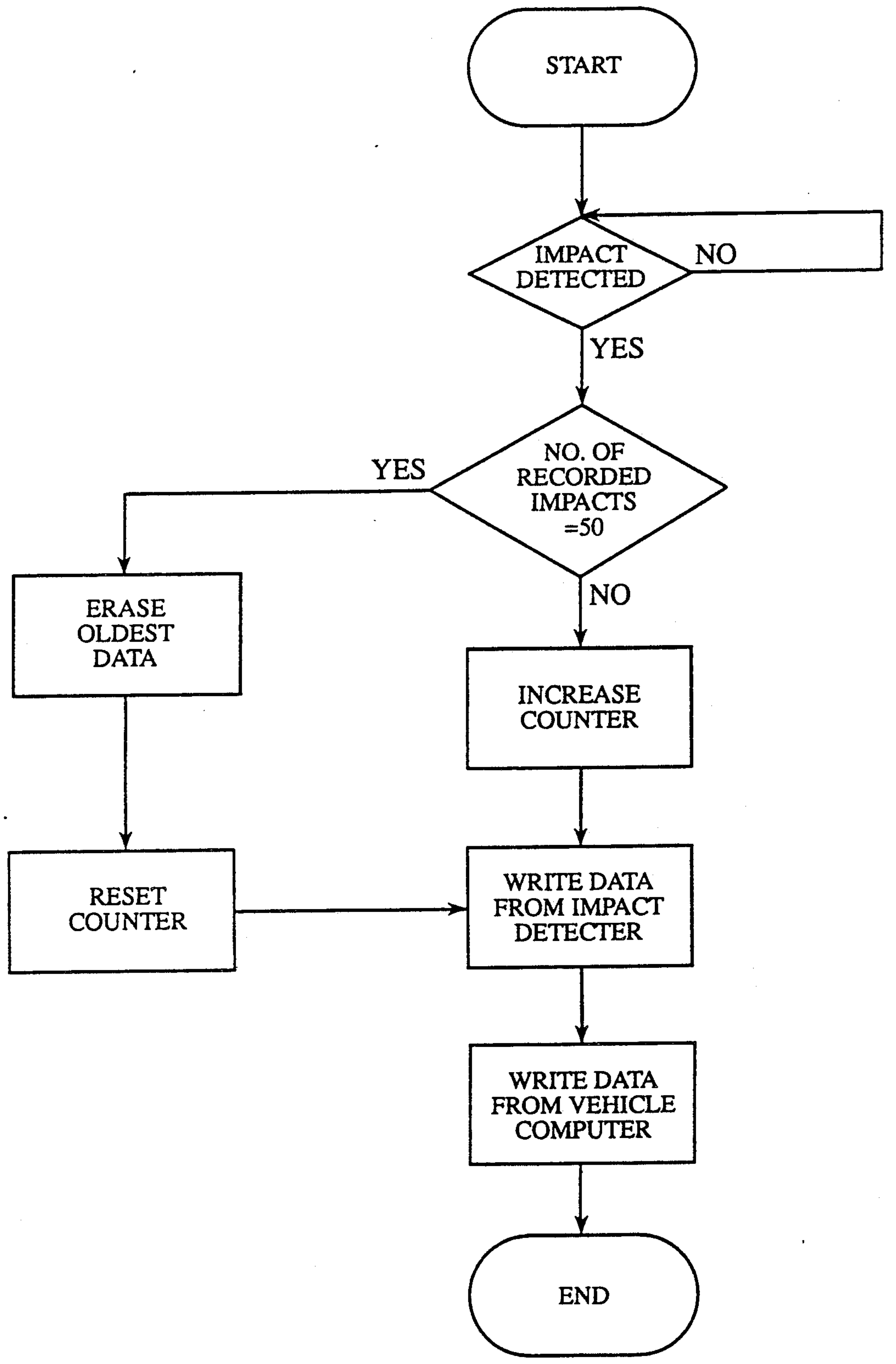
FIG. 3 is a diagrammatic view showing how the polling means in the preferred embodiment is programmed.

The use and operation of an embodiment of the invention will now be described in detail with reference to the drawings. Polling means 12, an Intel 8088 microprocessor programmed as shown by the flow-chart in FIG. 3, will continually monitor or poll sensor input lines 18. Impact sensors 20 will be designed to only respond to impacts that exceed a predetermined impact threshold level. In the preferred embodiment the threshold level will be 15 miles per hour.

In the operation of a motor vehicle equipped with the invention, a sensor 20 will respond by producing an electrical signal when it registers an impact greater than 15 miles per hour. This signal will be sensed by polling means 12 as it continually polls sensor input lines 18. Upon sensing a signal on any sensor input line 18 polling means 12 will be aware that motor vehicle 22 has sustained an impact greater than 15 miles per hour. Upon detection of such an impact, polling means 12 will first read data stored in data storage means 16 to determine the number of impacts exceeding 15 miles per hour which have been recorded to date. If the number of detected impacts exceeds a predetermined number of impacts the data storage in data storage means 16 that represents the oldest data will be erased. The detected impact will then be recorded as the most recent impact. If the predetermined number of impacts is not exceeded the detected impact will be recorded without erasing any data stored in data storage means 16. In the preferred embodiment the predetermined number of impacts which triggers erasure of the data representing the oldest impact stored in data storage means 16 is 50 However, the predetermined number of impacts which triggers erasure of data stored in data storage means 16 can be varied depending on the circumstance and upon the capacity of data storage means 16.

After determining whether to erase pre-existing data stored in data storage means 16, polling means 12 will determine which impact detector 20 was activated based on which sensor input line 18 carried a signal when polled by polling means 12. Each input line 18 is connected to a different impact sensor 20 so the particular input line 18 that carries a signal will identify which impact sensor was activated. Polling means 12 will then store data values in data storage means 16 which identify or represent both the occurrence of an impact and which impact detector 20 was activated. Polling means 12 will also determine the time and date of impact detection by reading the time and date from clock 13, via line 15, when a sensor 20 is activated. Polling means 20 will then store data values representing this time and date in data storage means 16.

Polling means 12 will then address the motor vehicle's on-board computer 30, via status input line 28, and request the current status of all systems being monitored by on-board computer 30. This will enable polling means 12 to determine the status of all systems monitored by on-board computer 30 as of the time of impact.

This invention is designed to take advantage of the on-board computers used on many modern motor vehicles. Modern motor vehicles include on-board computers, such as computer 30 shown in FIG. 1, which monitor and regulate engine operation to maximize engine efficiency while complying with limits on engine exhaust emissions. In many of these motor vehicles, the on-board computer is also used to monitor other systems in addition to engine operation. For example, in some cars, the computer monitors the passenger restraint system and provides a digitized voice warning when a passenger fails to manually buckle his or her seat belt and shoulder harness. The speed of the vehicle is also computed by the computer for cars that utilize electronic speedometers.

In this embodiment, polling means 12 will be programmed to determine, from on-board computer 30, the vehicle speed and whether passengers were wearing their seat belts and shoulder harnesses. This data, which represents the status of the vehicle upon impact, will be stored in data storage means 16 and will be available at a later date via serial output port 32.

In an alternate embodiment of the invention, data storage means 16, shown in FIG. 1, can be a removable programmable read only memory (hereinafter PROM). The PROM can be designed to be plugged into and unplugged from a conventional receptacle (not shown). This will allow PROM's to be removed and retained throughout the life of a motor vehicle to provide a complete record or history of the vehicle with regard to impacts it has been subjected to throughout its useful life. This may be especially desirable for commercial vehicles such as taxi cabs or trucks which may be driven by different persons at different times. For example, the data stored in the PROM's could be used to examine the driving records of the various drivers over an extended period of time.

Figure 4:
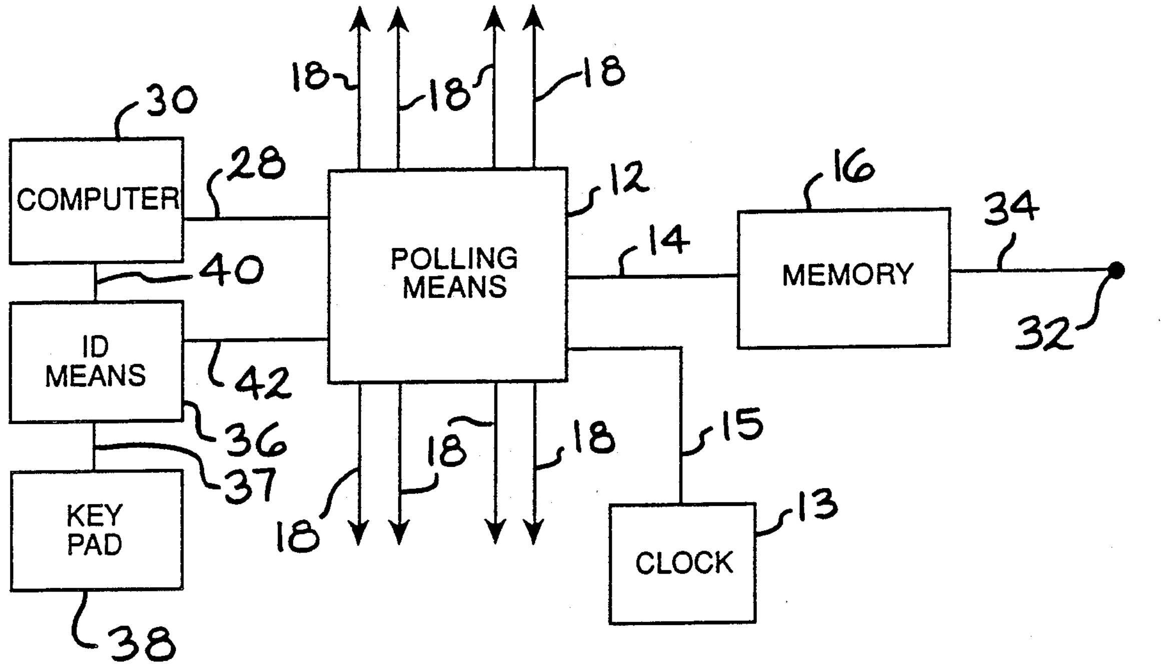
FIG. 4 is a diagrammatic view of an alternate embodiment of the invention which includes a vehicle operator identification system.

Another alternate embodiment of the invention, as shown in FIG. 4, can include identification means 36 which requires the motor vehicle operator to enter a personal numeric identification code on keypad 38 (connected to identification means 36 via line 37) before the vehicle can be operated. This system would be particularly suited to commercial vehicles which are driven by different drivers.

The identification means can be a dedicated microprocessor (as shown in FIG. 4) or it can be incorporated into the Intel 8088 microprocessor which is used as polling means 12. The microprocessor can be programmed so that it will send a vehicle enable signal, via vehicle enable line 40, to on-board computer 30 only when a correct personal numeric code is entered on keypad 38. Additionally, an identification code will be sent simultaneously to polling means 12, via identification input line 42, when a correct personal numeric identification code is entered on keypad 38. The vehicle enable signal received by on-board computer 30 will allow the driver to operate the motor vehicle. In the absence of receiving an enable signal computer 30 will maintain the vehicle in an inoperative state. The identification code received by polling means 12 will identify the vehicle operator and polling means 12 will store this information in data storage means 16. This will allow data retrieved from serial output port 32 to identify the operator of the motor vehicle for each recorded impact.

In an additional alternate embodiment of the invention, polling means 12 can be programmed to address on-board computer 30, via status input line 28, both at the time of impact and at predetermined time intervals after impact. Typically, the predetermined time intervals will be microseconds or seconds. This will enable the effect of an impact on a vehicle to be analyzed by examining any changes to the motor vehicle's status immediately following the initial impact.

Figure 5:
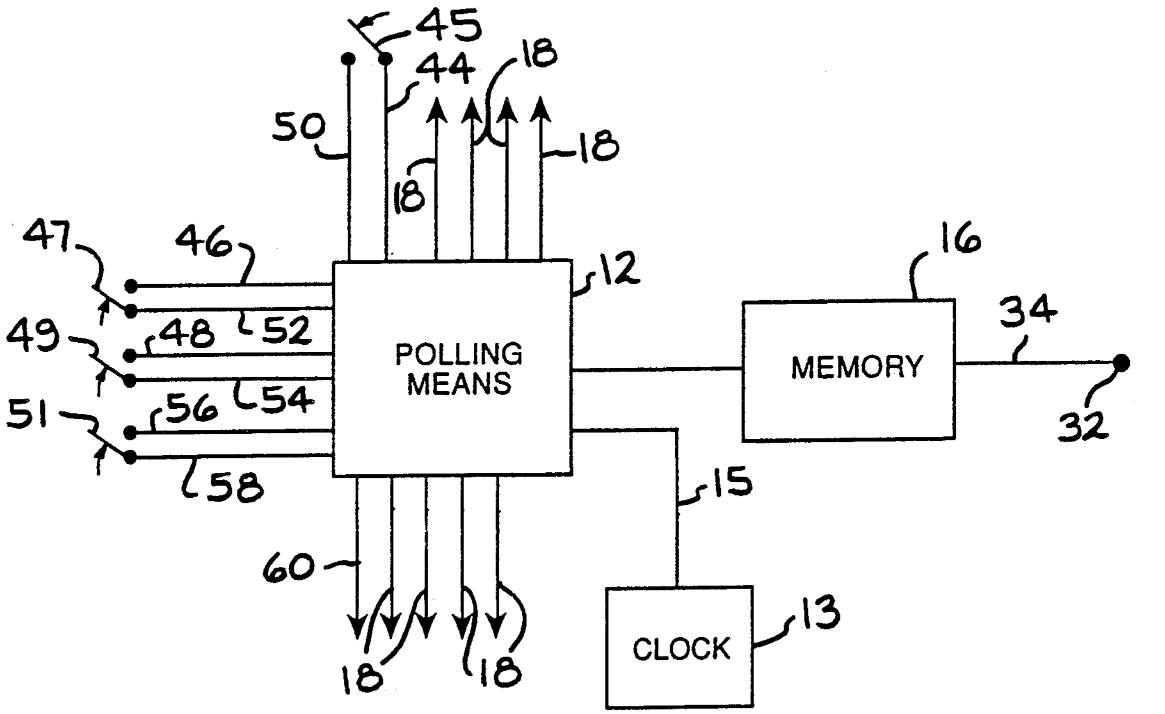
FIG. 5 is a diagrammatic view of an alternate embodiment of the invention designed for motor vehicles lacking on-board computers.

In another alternate embodiment of the invention, as shown in FIG. 5, the invention can be adapted for use in motor vehicles that do not have on-board computers. In this embodiment, polling means 12 can also be an Intel 8088 microprocessor but it will obtain vehicle status data directly from the vehicle systems for which data is desired. When polling means 12 senses a signal on any sensor input line 18, in response to activation of an impact sensor 20, it will send polling signals on polling lines 44, 46 and 48 to activation switches which activate/deactivate the vehicle systems being monitored. Polling line 44 will transmit a polling signal to the vehicle's directional signal switch 45 and if the switch is closed the polling signal will return to polling means 12 via signal return line 50. If the directional signal switch 45 is open the polling signal will not return to polling means 12 via signal return line 50. Polling line 46 will transmit a polling signal to the vehicle's headlight/taillight switch 47 and if switch 47 is closed the polling signal will return to polling means 12 via signal return line 52. If headlight/taillight switch 47 is open the polling signal will not return to polling means 12 via signal return line 52. Polling means 12 will record data indicating whether the vehicle directional signals and headlights/taillights were on or off based on whether polling signals were received by polling means 12 via signal return lines 50 and 52, respectively. Polling line 48 will also transmit a polling signal to each of the vehicle's passenger sensors 49 when polling means 12 receives a signal from sensor input line 18 indicating activation of an impact sensor 20. Typically, passenger sensor 49 can be a weight sensor embedded in each passenger seat which is activated or closed when a person sits on the seat. If passenger sensor 49 is closed the polling signal transmitted on line 48 will return to polling means 12 via signal return line 54. If passenger sensor 49 is open the polling signal will not return to polling means 12 via signal return line 54. If the polling signal for passenger sensor 49 is received by polling means 12 via signal return line 54 polling means 12 will record data indicating which passenger seats are occupied. Additionally, upon determining that a passenger seat is occupied, polling means 12 will transmit a polling signal, via a line 56, to each seat belt switch 51 which is typically a microswitch located in each seat belt's retractor unit. Seat belt switch 51 will only be activated or closed by the passenger fastening the seat belt, and the polling signal transmitted on line 56 will only return to polling means 12 via signal return line 58 if seat belt switch 51 is activated. If the polling signal returns to polling means 12 via signal return line 58 polling means 12 will record data indicating that the seat belt was in use by the passenger. Conversely, if the polling signal is not received by polling means 12 via signal return line 58 polling means 12 will record data indicating that the passenger did not utilize their seat belt.

Data, in the form of digital pulses representing wheel revolutions, can be obtained, via line 60, from a speed sensor (not shown) located at one of the motor vehicle's wheels, when polling means 12 receives a signal from sensor input line 18 indicating activation of an impact sensor 20. The speed sensor could typically be sensor clement 25 as shown and described in U.S. Pat. No. 4,638,289. This data can be processed by polling means 12 to determine the speed of motor vehicle 22 upon activation of an impact sensor 20.

There has thus been shown and described novel apparatus for detecting and storing motor vehicle impact data which fulfills all the objects and advantages sought. Many changes, modifications, variations, and other uses and applications of the subject invention will become apparent to those skilled in the art upon considering the specification and the accompanying drawings which disclose the preferred embodiments. All such changes, modifications, variations, and other uses and applications within the spirit and scope of the invention are deemed to be covered by the invention which is limited only by the claims which follow.

I claim:

1. Apparatus for detecting and storing motor vehicle status data responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data;

(c) polling means, connected to said source of motor vehicle status data and responsive to activation of at least one of said impact detection means, for determining substantially instantaneous data values representative of said motor vehicle status;

(d) data storage means for continuous storage of said instantaneous data values; and (e) data output means for retrieval of said instantaneous data values stored by said data storage means.

2. The apparatus of claim 1, wherein at least one of said instantaneous data values represent said motor vehicle speed.

3. The apparatus of claim 1, wherein at least one of said instantaneous data values represent the date and time.

4. The apparatus of claim 1, wherein at least one of said instantaneous data values represent the status of said motor vehicle passenger restraint systems.

5. The apparatus of claim 1, wherein at least one of said instantaneous data values identify the status of said motor vehicle lighting.

6. The apparatus of claim 5, wherein at least one of said instantaneous data values further identify the status of said vehicle directional signal lights.

7. The apparatus of claim 5, wherein at least one of said instantaneous data values further identify the status of said vehicle headlights.

8. The apparatus of claim 5, wherein at least one of said instantaneous data values further identify the status of said vehicle taillights.

9. The apparatus of claim 1, wherein said predetermined impact threshold level is 15 miles per hour.

10. The apparatus of claim 1, wherein said data storage means is a PROM.

11. The apparatus of claim 10, wherein said PROM is removably connected to said apparatus for detecting and storing motor vehicle impact data.

12. The apparatus of claim 1, wherein said data storage means is an EPROM.

13. The apparatus of claim 1, wherein said data output means is a serial port.

14. The apparatus of claim 1, wherein said polling means is a microprocessor.

15. The apparatus of claim 14, wherein said source of motor vehicle status data is said vehicle on-board computer.

16. Apparatus for detecting and storing motor vehicle status data responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data;

(c) polling means, connected to said source of motor vehicle status data and responsive to activation of at least one of said impact detection means, for determining substantially instantaneous data values representative of said motor vehicle status, wherein at least one of said instantaneous data values identify the particular impact detection means activated;

(d) data storage means for continuous storage of said instantaneous data values; and (e) data output means for retrieval of said instantaneous data values stored by said data storage means.

17. The apparatus of claim 16, further comprising identification means for ascertaining said motor vehicle operator, said identification means comprising a data entry device which enables operation of said motor vehicle upon entry of a valid operator identification code, and which enables storage of data identifying said operator in said data storage means.

18. The apparatus of claim 16, wherein said polling means is a microprocessor programmed to periodically erase said stored instantaneous data values whenever a predetermined number of motor vehicle impacts exceeding a predetermined impact threshold level are sensed by said impact detection means.

19. The apparatus of claim 16, wherein said polling means is a microprocessor.

20. The apparatus of claim 19, wherein said source of motor vehicle status data is said motor vehicle on-board computer.

21. The apparatus of claim 20, wherein said source of motor vehicle status data further comprises a plurality of polling lines, each of said polling lines connecting said polling means to an activation switch for said motor vehicle system being monitored, said polling line capable of transmitting a signal from said polling means to said activation switch, and a plurality of signal return lines connecting each of said activation switches to said polling means and capable of receiving said signal transmitted to said activation switch only when said activation switch is in an activated position, so that said instantaneous data values representative of said motor vehicle status are determined from the signals received by said polling means from said activation switches signal return lines.

22. Apparatus for detecting and storing motor vehicle status data responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data;

(c) polling means, connected to said source of motor vehicle status data and responsive to activation of at least one of said impact detection means, for determining data values representative of said motor vehicle status, said data values being determined substantially contemporaneously with said impact detection means sensing an impact exceeding a predetermined threshold level, and at subsequent predetermined intervals following said impact;

(d) data storage means for continuous storage of said instantaneous data values; and (e) data output means for retrieval of said instantaneous data values stored by said data storage means.

23. The apparatus of claim 22, wherein said polling means is a microprocessor.

24. Apparatus for detecting and storing motor vehicle status data responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data wherein said source of motor vehicle status data is said motor vehicle on-board computer;

(c) polling means, connected to said source of motor vehicle status data and responsive to activation of at least one of said impact detection means, for determining data values representative of said motor vehicle status, said data values being determined substantially contemporaneously with said impact detection means sensing an impact exceeding a predetermined threshold level, and at subsequent predetermined intervals following said impact, wherein said polling means is a microprocessor;

(d) data storage means for continuous storage of said instantaneous data values; and (e) data output means for retrieval of said instantaneous data values storage by said data storage means.

25. The apparatus of claim 24, further comprising identification means for ascertaining said motor vehicle operator, said identification means comprising a data entry device which enables operation of said motor vehicle upon entry of a valid operator identification code, and which enables storage of data identifying said operator in said data storage means.

26. Apparatus for detecting and storing motor vehicle status data responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data, wherein said source of motor vehicle status data further comprises a plurality of polling lines, each of said polling lines connecting said polling means to an activation switch for said motor vehicle system being monitored, said polling line capable of transmitting a signal from said polling means to said activation switch, and a plurality of signal return lines connecting each of said activation switches to said polling means and capable of receiving said signal transmitted to said activation switch only when said activation switch is in an activated position, so that said data values representative of said motor vehicle status are determined from the signals received by said polling means from said activation switches signal return lines;

(c) polling means, connected to said source of motor vehicle status data and responsive to activation of at least one of said impact detection means, for determining data values representative of said motor vehicle status, said data values being determined substantially contemporaneously with said impact detection means sensing an impact exceeding a predetermined threshold level, and at a subsequent predetermined intervals following said impact, wherein said polling means is a microprocessor;

(d) data storage means for continuous storage of said instantaneous data values; and (e) data output means for retrieval of said instantaneous data values stored by said data storage means.

27. Apparatus for detecting and storing motor vehicle status data, responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data;

(c) a microprocessor, connected to said source of motor vehicle status data and responsive to said impact detection means, which upon activation of at least one of said impact detection means, is programmed to determine data values representative of said motor vehicle status, wherein said data values identify said activated impact detection means, said activation time and date, said motor vehicle speed, said vehicle passenger restraint systems status, said vehicle lights status, and said vehicle directional signals status at substantially the time of activation of said impact detection means;

(d) an EPROM, connected to said microprocessor, which provides continuous storage of said data values, said EPROM being responsive to said microprocessor which periodically erases said data values stored in said EPROM whenever a predetermined number of motor vehicle impacts exceeding a predetermined impact threshold level are sensed by said impact detection means; and (e) a serial output port for retrieval of said stored data values from said EPROM.

28. Apparatus for detecting and storing motor vehicle status data responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data;

(c) a microprocessor, connected to said source of motor vehicle status data and responsive to said impact detection means, which upon activation of at least one of said impact detection means, is programmed to determine data values representative of said motor vehicle status, wherein said data values identify said activated impact detection means, said activation time and date, said motor vehicle speed, said vehicle passenger restraint systems status, said vehicle lights status, and said vehicle directional signals status at substantially the time of activation of said impact detection means;

(d) an EPROM, connected to said microprocessor, which provides continuous storage of said data values, said EPROM being responsive to said microprocessor which periodically erases said data values stored in said EPROM whenever a predetermined number of motor vehicle impacts exceeding a predetermined impact threshold level are sensed by said impact detection means;

(e) a serial output port for retrieval of said stored data values from said EPROM; and (f) identification means for ascertaining said motor vehicle operator, said identification means comprising a data entry device which enables operation of said motor vehicle upon entry of a valid operator identification code, and which enables storage of data identifying said operator in said data storage means.

29. Apparatus for detecting and storing motor vehicle status data responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data; wherein said source of motor vehicle status data is said motor vehicle on-board computer;

(c) a microprocessor, connected to said source of motor vehicle status data and responsive to said impact of said impact detection means, is programmed to determine data values representative of said motor vehicle status, wherein said data values identify said activated impact detection means, said activation time and date, said motor vehicle speed, said vehicle passenger restraint systems status, said vehicle lights status, and said vehicle directional signals status at substantially the time of activation of said impact detection means;

(d) an EPROM, connected to said microprocessor, which provides continuous storage of said data values, said EPROM being responsive to said microprocessor which periodically erases said data values stored in said EPROM whenever a predetermined number of motor vehicle impacts exceeding a predetermined impact threshold level are sensed by said impact detection means; and (e) a serial output port for retrieval of said storage data values from said EPROM.

30. Apparatus for detecting and storing motor vehicle status data, responsive to an impact, comprising:

(a) a plurality of impact detection means, located adjacent exterior surfaces of said motor vehicle, for sensing motor vehicle impacts exceeding a predetermined impact threshold level;

(b) a source of motor vehicle status data; wherein said source of motor vehicle status data further comprises a plurality of polling lines, each of said polling lines connecting said polling means to an activation switch for said motor vehicle system being monitored, said polling line capable of transmitting a signal from said polling means to said activation switch, and a plurality of signal return lines connecting each of said activation switches to said polling means and capable of receiving said signal transmitted to said activation switch only when said activation switch is in an activated position, so that said data values representative of said motor vehicle status are determined from the signals received by said polling means from said activation switches signal return lines;

(c) a microprocessor, connected to said source of motor vehicle status data and responsive to said impact detection means, which upon activation of at least one of said impact detection means, is programmed to determine data values representative of said motor vehicle status, wherein said data values identify said activated impact detection means, said activation time and date, said motor vehicle speed, said vehicle passenger restraint systems status, said vehicle lights status, and said vehicle directional signals status at substantially the time of activation of said impact detection means;

(d) an EPROM, connected to said microprocessor, which provides continuous storage of said data values, said EPROM being responsive to said microprocessor which periodically erases said data values stored in said EPROM whenever a predetermined number of motor vehicle impacts exceeding a predetermined impact threshold level are sensed by said impact detection means; and (e) a serial output port for retrieval of said stored data values from said EPROM.

* * * * *

UNITED STATES PATENT AND TRADEMARK OFFICE

CERTIFICATE OF CORRECTION

PATENT NO. : 4,992,943

DATED : February 12, 1991

INVENTOR(S) : Jack J. McCracken

It is certified that error appears in the above-identified patent and that said Letters Patent is hereby corrected as shown below:

In Column 2, Line 21, substitute --device-- for "devise".

In Column 5, Line 41, substitute --fifty-- for "50".

In Column 5, Line 60, substitute --means 12-- for "means 20".

In Column 8, Line 1, substitute --element 25-- for "clement 25".

In Claim 24, Column 10, Line 36, substitute --data values stored-- for "data values storage".

In Claim 26, Column 11, Line 6, delete "a" after "at".

In Claim 30, Column 12, Line 48, substitute a -- , -- for ";".

Signed and Sealed this

Fourteenth Day of January, 1992

*Attest:*

HARRY F. MANBECK, JR.

*Attesting Officer* *Commissioner of Patents and Trademarks*